(12) United States Patent
Grandbois

(10) Patent No.: US 8,501,293 B2
(45) Date of Patent: Aug. 6, 2013

(54) PLURALITY OF SNO FLAKES

(71) Applicant: Dow Global Technologies LLC, Midland, MI (US)

(72) Inventor: Matthew L. Grandbois, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/632,010

(22) Filed: Sep. 30, 2012

(65) Prior Publication Data

US 2013/0084414 A1 Apr. 4, 2013

Related U.S. Application Data

(60) Provisional application No. 61/541,933, filed on Sep. 30, 2011.

(51) Int. Cl.
*B29D 22/00* (2006.01)
(52) U.S. Cl.
USPC .......................................... 428/35.8; 428/402
(58) Field of Classification Search
USPC ............................ 428/35.8, 323, 402; 423/618
See application file for complete search history.

(56) References Cited

U.S. PATENT DOCUMENTS

| | | | |
|---|---|---|---|
| 2013/0084240 A1 | 4/2013 | Grandbois | |
| 2013/0084414 A1* | 4/2013 | Grandbois | 428/35.8 |
| 2013/0108512 A1 | 5/2013 | Grandbois | |

FOREIGN PATENT DOCUMENTS

| | | |
|---|---|---|
| CN | 101367543 A | 2/2009 |
| CN | 101665266 A | 3/2010 |
| JP | 60-221319 | 11/1985 |
| JP | 01051330 A | 2/1989 |
| JP | 03223112 A | 10/1991 |
| JP | 11-310415 | 4/1998 |
| JP | 2009-132570 | 11/2007 |
| JP | 2009-132571 | 11/2007 |

OTHER PUBLICATIONS

Schryer et al, "Effects of pretreatment conditions on a Pt/$SnO_2$ catalyst for the oxidation of CO in $CO_2$ lasers", Journal of Catalysis, 1990, vol. 122; pp. 193-197.

Charvin et al, "Experimental study of $SnO_2$/SnO/Sn thermochemical systems for solar production of hydrogen", AIChE Journal, 2008, vol. 54, No. 10; pp. 2759-2767.

Drawdy et al, "Effect of pretreatment on a platinized tin oxide catalyst used for low-temperature CO oxidation", Surface and Interface Analysis, 1990, vol. 16, pp. 369-374.

\* cited by examiner

*Primary Examiner* — N. Edwards
(74) *Attorney, Agent, or Firm* — S. Matthew Cairns

(57) ABSTRACT

Stannous oxide particles having a methane sulfonic acid dissolution rate of 3.56 g stannous oxide in 8.1 g of 70% methane sulfonic acid of 30 seconds at a temperature of 20 to 25° C. are disclosed, including methods of making them. Also disclosed are packaged stannous oxide particles that reduce the formation of stannic oxide on the surface of the particles over time.

11 Claims, 1 Drawing Sheet

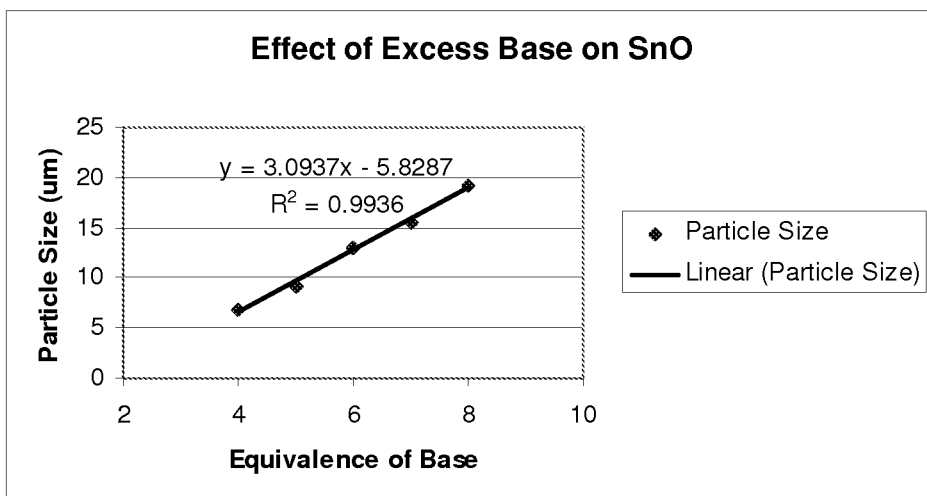

PLURALITY OF SNO FLAKES

The present invention relates to the field of metal oxides, and particularly to the manufacture of stannous oxide (SnO).

Various metals, such as tin, are used in the manufacture of electronic devices. For example, pure tin and tin alloys such as tin-lead, tin-bismuth, tin-silver, and tin-silver-copper, are used as solders on interconnect packages. Such metals are often deposited on an electronic device substrate by electroplating. Typically, tin electroplating baths comprise divalent tin ions, optionally ions of an alloying metal such as silver, copper, bismuth, and combinations thereof, an acid electrolyte, and optionally one or more of various organic additives. Stannous oxide (tin (II) oxide) is a common source of divalent tin ions. Stannous oxide may be dissolved in tin electroplating baths directly, or may be dissolved in acid separately and then added to the plating bath as a solution.

Stannous oxide is conventionally prepared by dissolving tin metal in a mineral acid, such as hydrochloric acid, followed by neutralization with alkali such as sodium hydroxide, and the resulting product is heated to form the desired tin (II) oxide. Such stannous oxide typically has a large amount of residual chloride ion. When such stannous oxide is used to prepare tin-alloy plating baths, such as tin-silver or tin-silver-copper plating baths, the residual chloride ion may form silver chloride, which precipitates from the bath. The formation of silver chloride not only reduces the concentration of silver in the plating bath, the presence of the precipitate itself is undesirable. Also, certain forms of stannous oxide are less readily dissolved in the acid electrolyte, forming turbid solutions. Further, stannous oxide forms stannic oxide (or tin (IV) oxide) over time. Stannic oxide is difficult to dissolve in acids, making it impractical for plating bath applications.

Japanese published patent application JP 11-310415 A discloses a process for making stannous oxide by dissolving $SnCl_2$ in hydrochloric acid, neutralizing the solution with a mixture of ammonia water and ammonium bicarbonate where the neutralized solution has a pH of 6-10, followed by heating the neutralized solution at >50° C. This patent application discloses an acid solution having a very high tin concentration, with a tin (II) ion:mineral acid weight ratio near 1. The size of the stannous oxide particles obtained seems to depend on the pH of the neutralized solution, with smaller sized particles (<10 μm) being obtained at a pH of 6-7.5, and larger sized particles (10-50 μm) being obtained a pH value near 10. JP 11-310415 A further discloses surface treating the resulting stannous oxide with various organic materials such as L-ascorbic acid, gluconic acid, hydroxylamines, phenols, aldehydes and sodium nitrite to prevent surface oxidation to stannic oxide. The stannous oxide obtained from this process still has undesirable levels of chloride ion (25-48 ppm). In addition, the organic material used as a surface treatment may build up in a tin-containing plating bath and may adversely affect the tin-containing deposit. There remains a need for stannous oxide having very low levels of chloride ion impurity. There is also a need for stannous oxide that can be stored for periods of time without forming stannic oxide and that does not impart undesired organic materials to a tin-containing plating bath.

Japanese published patent application JP 2009-132570 A discloses a process for making stannous oxide by dissolving tin metal in hydrochloric acid (30-40% by mass), neutralizing the solution with ammonia water, ammonium bicarbonate or a mixture thereof, where the neutralized solution has a pH of 6-8, followed by heating the neutralized solution at 80-100° C., where the neutralization and heating steps are performed under nitrogen. The pH of the neutralized solution is critical for the better solubility of the stannous oxide produced. When the pH exceeds 8, insoluble salts are purported to form. This patent application states that it is physically impossible to heat the neutralized solution above 100° C. According to JP 2009-132570 A, this process produces stannous oxide particles having a D50 of 10-11 μm, and that larger sized particles have low solubility. This patent publication fails to discuss the level of chloride ion impurity. There remains a need for a process for making stannous oxide that can be operated at a wider range of pH values, and that provides stannous oxide particles having a very low level of chloride ion impurity with good solubility in acids.

Some of the metals used in the manufacture of electronic devices may contain low levels of certain radioactive isotopes that emit alpha-particles ("alpha-particle emitters"). Examples of such radioactive isotopes include $^{210}Pb$, which is a member of the uranium decay chain, which is a main contributor of alpha particle emitters as impurities within bulk metal materials (e.g. silver and tin), as well as various common contaminants of lead, such as isotopes of uranium ($^{234,238}U$), thorium ($^{230}Th$), radium ($^{226}Ra$), radon ($^{222}Rn$), polonium ($^{210,218}Po$) and bismuth ($^{211,212}Bi$). Solders are commonly utilized in semiconductor device packaging to attach an integrated circuit ("IC") chip to a package or a substrate. If the solders attaching IC circuitry contain alpha-particle emitters, the alpha-particles are emitted in close proximity to the ICs and can cause damage to packaged semiconductor devices. Specifically, these emitted alpha-particles are capable of causing a change in electrical states, referred to as "soft errors." The errors are referred to as being "soft" because they are not permanent. However, these errors will typically cause at least one round of incorrect calculations. These soft errors are an increasingly large problem for integrated circuit chip fabricators. Accordingly, it is desired to reduce the concentration of alpha-particle emitters within the solders.

The present invention provides a method of manufacturing a plurality of stannous oxide particles comprising: a) providing an acidic composition comprising divalent tin ions and mineral acid; b) contacting the acidic composition with a base having a pKa value of 4.75 to 15 to form an alkaline composition having a pH of 8.5 to 12; c) heating the alkaline composition to a temperature of $\geq 100°$ C. for a period of time sufficient to form a plurality of stannous oxide particles; d) optionally separating the plurality of stannous oxide particles; and e) optionally washing the stannous oxide particles. The base is free of added hydroxide ions. Preferably, the stannous oxide particles are separated.

Also provided by the present invention is a plurality of stannous oxide particles having: an average purity of $\geq 99.8\%$; an average surface tin:oxygen ratio of from 0.75 to 1; an average particle size of $\leq 40$ μm; a true density of 6 to 6.5 g/cm$^3$; a bulk density of 2 to 2.5 g/cm$^3$; a chloride ion content of $\leq 25$ ppm; and an alkali content of $\leq 50$ ppm.

The present invention further provides a product comprising a plurality of stannous oxide particles having: an average purity of $\geq 99.8\%$; an average surface tin:oxygen ratio of from 0.75 to 1; an average particle size of $\leq 40$ μm; a true density of 6 to 6.5 g/cm$^3$; a bulk density of 2 to 2.5 g/cm$^3$; a chloride ion content of $\leq 25$ ppm; and an alkali content of $\leq 50$ ppm, contained within a sealed package, the sealed package being comprised of a material having an oxygen permeability of <100 cm$^3$/645 cm$^2$·24 hr.

FIG. 1 is a plot of average particle size (in μm) of stannous oxide particles versus the molar excess of base used to manufacture the particles.

The articles "a" and "an" refer to the singular and the plural. Unless otherwise noted, all amounts are percentages by weight ("wt %") and all ratios are molar ratios. All numerical ranges are inclusive and combinable in any order except where it is clear that such numerical ranges are constrained to add up to 100%. The terms "alpha-particle emitters" and "alpha-particle emitting materials" are used interchangeably. As used herein, the term "substantially free of" an item means the material or composition contains less than 0.5% of that item. The following abbreviations have the following meanings: cm=centimeter; µm=micron=micrometer; Å=angstrom; ppm=parts per million; g=grams; kg=kilograms; mL=milliliters; L=liters; wt %=percent by weight; sec.=seconds; min=minutes; hr=hours; and ° C.=degrees Celsius.

Stannous oxide is typically used as a source of divalent tin ions for tin and tin alloy electroplating baths. To be useful in preparing such electroplating baths for use in the electronics industry, the stannous oxide must be readily soluble in the acid electrolyte, and must contain low levels of impurities, particularly halide and sodium impurities. The present invention provides a plurality of stannous oxide particles that are readily soluble in acid electrolytes, contain very low levels of impurities, and have a very low level of stannic oxide ($SnO_2$) surface coating. The present plurality of stannous oxide particles has: an average purity of $\geq 99.8\%$; an average surface tin:oxygen ratio of 0.75 to 1; an average particle size of 5 to 40 µm; a true density of 6 to 6.5 g/cm$^3$; a bulk density of 2 to 2.5 g/cm$^3$; a chloride ion content of $\leq 25$ ppm; and an alkali content of $\leq 50$ ppm.

The average purity of the plurality of stannous oxide particles is determined by analyzing them for metal impurity content by inductively coupled plasma-mass spectroscopy ("ICP-MS"), using any conventional equipment. Preferably, the plurality of stannous oxide particles has a purity of $\geq 99.85\%$, and more preferably $\geq 99.9\%$. The present plurality of stannous oxide particles has an alkali, specifically sodium, content of $\leq 50$ ppm, preferably $\leq 40$ ppm, more preferably $\leq 25$ ppm, yet more preferably $\leq 15$ ppm, even more preferably $\leq 10$ ppm, and most preferably $\leq 5$ ppm, as determined by ICP-MS. Chloride ion content can be determined by various techniques, such as powder X-ray diffraction and ion chromatography. The present plurality of stannous oxide particles has a chloride ion content of $\leq 25$ ppm, preferably $\leq 20$ ppm, more preferably $\leq 15$ ppm, and yet more preferably $\leq 10$ ppm, as determined by ion chromatography.

Surface oxidation plays a significant role in the reactivity between stannous oxide and acids used as electrolytes in plating baths, such as alkane sulfonic acids. The amount of surface oxidation is quantitatively determined via high resolution X-ray photoelectron spectroscopy ("XPS"). The tin 3d 5/2 electron binding energy of stannic oxide ($SnO_2$) is slightly higher than that of stannous oxide (SnO), 486.9 eV and 486.2 eV, respectively. The ratio of XPS signals at these binding energies provides a ratio of tin-to-oxygen (Sn:O or tin:oxygen). Stannic oxide has a Sn:O ratio of 0.5 and stannous oxide has a Sn:O value of 1.0. The closer the Sn:O value is to 1, the higher the stannous oxide content. It is preferred that the plurality of stannous oxide particles has an average surface tin:oxygen ratio of from 0.8 to 1, and more preferably a ratio of from 0.85 to 1.

Conventionally, it is believed that a plurality of stannous oxide particles having a very low average particle size, such as <10 µm, is required for good solubility in acids. However, the inventor has found that a plurality of stannous oxide particles having an average particle size of $\leq 40$ µm is readily soluble in acids used as electrolytes, specifically alkane sulfonic acids. It is preferred that the plurality of stannous oxide particles has an average particle size of 0.5 to 40 µm, more preferably from 1 to 40 µm, yet more preferably from 1 to 35 µm, and even more preferably from 1 to 25 µm. Particle size measurements are performed using conventional particle sizing equipment (Particle Sizing System Accusizer 780) using polystyrene spheres in water as the calibration standard.

The true density, or skeletal density, of stannous oxide particles is based on the amount of volume that only the SnO structure occupies, that is, excluding pores, channels, and the like. The bulk density refers to the amount of volume that the bulk stannous oxide particles occupy. Bulk density values for the stannous oxide particles depend upon the process used to make them. The present plurality of stannous oxide particles has a true density of 6 to 6.5 g/cm$^3$ and a bulk density of 2 to 2.5 g/cm$^3$. The true density is determined using a Helium multipycnometer equipped with a 24 cm$^3$ sample holder. The bulk density is determined by measuring the volume of a known weight of test substance in a cylinder that is rolled horizontally after filling to 90% of its measuring volume.

The present invention provides a plurality of stannous oxide particles having: an average purity of $\geq 99.8\%$; an average surface tin:oxygen ratio of from 0.75 to 1; an average particle size of $\leq 40$ µm; a true density of 6 to 6.5 g/cm$^3$; a bulk density of 2 to 2.5 g/cm$^3$; a chloride ion content of $\leq 25$ ppm; and an alkali content of $\leq 50$ ppm, wherein the plurality of stannous oxide particles are prepared by the steps comprising: a) providing an acidic composition comprising divalent tin ions and mineral acid; b) contacting the acidic composition with a base having a pKa value of 4.75 to 15 to form an alkaline composition having a pH of 8.5 to 12; c) heating the alkaline composition to a temperature of $\geq 100°$ C. for a period of time sufficient to form a plurality of stannous oxide particles; d) optionally separating the plurality of stannous oxide particles; and e) optionally washing the stannous oxide particles.

An acidic composition comprising divalent tin ions (or tin (II) ions or stannous ions) and a mineral acid is provided. Such a composition can be prepared by dissolving a suitable tin salt in a mineral acid. Alternatively, this composition is prepared by dissolving tin metal in a mineral acid. Suitable tin salts include, without limitation: tin halides such as stannous chloride and stannous bromide; stannous sulfate; stannous alkane sulfonate; and stannous aryl sulfonate. Tin halides are the preferred tin salts, more preferably stannous chloride and stannous bromide; and most preferably stannous chloride. Mixtures of tin salts may be used. The tin compounds useful in the present invention are generally commercially available from a variety of sources. Suitable mineral acids include, without limitation: hydrohalogen acids such as hydrochloric acid and hydrobromic acid; perchloric acid; periodic acid; sulfuric acid; and nitric acid. Preferably the mineral acid is a hydrohalogen acid, more preferably hydrochloric acid or hydrobromic acid, and most preferably hydrochloric acid. Suitable mineral acids are commercially available from a variety of sources. It is preferred that the acidic composition of divalent tin ions and mineral acid is prepared by dissolving tin metal in a hydrohalogen acid, and more preferably by dissolving tin metal in hydrochloric acid. Water is typically also added to the acidic composition. In a preferred embodiment, the acidic composition is composed of divalent tin ions, mineral acid and water. Any grade of water may be used, but it is preferred that the water be free of, or at least substantially free of, trace impurities. Deionized ("DI") water is preferred.

The acidic composition may be prepared by combining the components in any order, but it is preferred to combine them in the order of tin ion source, water and then mineral acid. This composition may be prepared at any suitable temperature, such as from 20 to 35° C., although higher or lower temperatures may be used. The weight ratio of tin:mineral acid in the acidic composition is typically from 0.3 to 0.6, preferably from 0.3 to 0.55, more preferably from 0.35 to 0.55, and yet more preferably from 0.4 to 0.5. It is further preferred that the mineral acid is used is in a 3- to 8-fold molar excess, and more preferably a 3- to 5-fold molar excess. It is preferred that the acidic composition contain an equivalent amount of $SnCl_2$ in an amount of 0.1 to 10 wt %, more preferably from 1 to 10 wt %, and still more preferably from 5 to 10%. It is further preferred that the mineral acid be present in the acidic composition in an amount of 0.1 to 20 wt %, more preferably from 1 to 20 wt %, still more preferably from 5 to 20 wt %, and even more preferably from 10 to 20 wt %. When tin metal is used as the source of divalent tin ions, the time necessary for the complete digestion of the tin metal depends on the amount of excess mineral acid used. Generally, the digestion of the tin metal is complete within 72 hours, preferably with 48 hours, more preferably within 24 hours, and yet more preferably within 12 hours when the composition is heated to >100° C. The preparation of the acidic composition is preferably performed in an atmosphere substantially free of oxygen, and more preferably in an oxygen-free atmosphere. It is preferred that the acidic composition is prepared in an inert atmosphere, such as nitrogen or argon, and more preferably nitrogen.

When tin metal is used as the source of divalent tin ions, it is preferred that the tin metal have a low alpha-particle emitter content. The amount of alpha-particle emitters present in a metal is typically determined by an alpha flux measurement, with results stated in terms of alpha-particle counts per unit area per hour ($cts/cm^2/hr$ or $cph/cm^2$). It is preferred the tin metal used has an alpha flux of $\leq 0.05$ $cts/cm^2/hr$, and more preferably from 0.0001 to 0.02 $cts/cm^2/hr$.

The acidic composition is contacted with a weak base to form an alkaline composition having a pH of 8.5 to 12. As used herein, the term "weak base" refers to any suitable base having a pKa of 4.75 to 15. Preferably, the weak base has a pKa of from 5 to 12, and more preferably from 5 to 11. A wide variety of weak bases may be suitably used, and are well known to those skilled in the art. Preferred weak bases are sodium carbonate, sodium bicarbonate, potassium carbonate, potassium bicarbonate, ammonium carbonate, ammonium bicarbonate, sodium acetate, potassium acetate, and ammonium acetate. The weak base is more preferably chosen from sodium carbonate, sodium bicarbonate, potassium carbonate, potassium bicarbonate, ammonium carbonate, and ammonium bicarbonate, and yet more preferably chosen from sodium carbonate, sodium bicarbonate, potassium carbonate, and potassium bicarbonate. Mixtures of weak bases may be used. The present base is free of added hydroxide ions. More preferably, the present base is free of added ammonia. By "free of added hydroxide ions" is meant that hydroxide ions are not intentionally used as the base, but hydroxide ion may be present in the alkaline composition as a result of a chemical reaction. By "free of added ammonia" is meant that neither ammonia nor ammonia water is intentionally used as the base, but ammonia may be present in the alkaline composition as a result of a chemical reaction. Most preferably, the base is free of hydroxide ions and free of added ammonia. Suitable bases are commercially available form a variety of sources.

Sufficient weak base is added to the acidic composition to neutralize the acid and provide an alkaline composition having a pH of 8.5 to 12. Preferably, the alkaline composition has a pH value of 8.5 to 11, and more preferably 9 to 11. It has been found that when a pH >12 is used, the resulting stannous oxide does not have the desired solubility in methane sulfonic acid. The base may be added to the acidic composition as a solid, or dissolved in a suitable solvent such as water. When the base is added as an aqueous solution, it is preferably added to the acidic composition at a rate of 1 to 1000 mL/min. The rate of addition of the base to the acidic composition should be selected to minimize the amount of time the composition experiences a pH in the range of 4 to 7. It has been found that the average size of the plurality of stannous oxide particles can be controlled by the amount of excess base used during this neutralization step. For example, when a 4-fold molar excess of base is used, the resulting plurality of stannous oxide particles has an average particle size of 6-8 µm, and when an 8-fold molar excess is used, the resulting particles have an average particle size of 18-20 µm.

The temperature of the composition during the addition of the base is typically maintained in the range of 20 to 50° C., and more preferably from 20 to 45° C. The temperature of the alkaline composition following the addition of the base is typically from 20 to 45° C. Preferably, contacting the acidic composition with the base is performed under an atmosphere that is substantially-free of oxygen, and preferably free of oxygen. Nitrogen or argon is a suitable atmosphere.

While not intending to be bound by theory, contacting the acidic composition with a base according to the present process provides a white to light gray precipitate which is believed to be a tin oxyhydroxide, such as $Sn_3O_2(OH)_2$. Once the alkaline composition having a pH in the range of 8.5 to 12 is obtained, the heating step can be initiated.

The alkaline composition is heated to $\geq 70°$ C. for a period of time sufficient to form stannous oxide. Preferably, the alkaline composition is heated to a temperature of 75 to 110° C., more preferably from 100 to 110° C., and most preferably to 105° C. The alkaline composition is heated at any suitable rate to reach a temperature of $\geq 70°$ C., and preferably to reach 100 to 110° C. Upon reaching a temperature of $\geq 70°$ C., preferably 100 to 110° C., and most preferably to 105° C., the alkaline composition is held at this temperature for a period of time sufficient to form a plurality of stannous oxide particles. Such period of time is typically from 1 sec. to 5 hr., preferably from 1 sec. to 4 hr., more preferably from 1 sec. to 3 hr, and most preferably from 1 sec. to 1 hr. After this period of time, the alkaline composition is then cooled down to ambient temperature, such as from 20 to 35° C. The heating step is preferably performed in an atmosphere substantially free of oxygen, and more preferably free of oxygen. Nitrogen and argon are suitable atmospheres.

Following heating, a composition containing a clear to colorless liquid and a blue-black precipitate is obtained. The blue-black precipitate, which is stannous oxide, is then optionally separated from the liquid by any suitable means, such as by filtration, decantation, centrifugation, or any combination thereof. Preferably, the stannous oxide particles are separated from the liquid. The obtained blue-black solid is then optionally washed with water, such as DI water, one or more times. It is preferred that the blue-black precipitate is washed one or more times with water. The separation and optional washing steps are each preferably performed in an atmosphere that is substantially free of oxygen, and more preferably is free of oxygen.

The obtained stannous oxide is typically dried. Such drying may be performed at atmospheric pressure or may be performed at reduced pressure. In general, the stannous oxide is heated during drying, preferably at a temperature of 70 to 100° C., and more preferably at 70 to 80° C. Such drying step is typically performed for up to 24 hr., preferably for 1 to 24 hr., and most preferably for 3 to 24 hr. It is preferred that the drying step be performed in an atmosphere that is substantially free of oxygen, and preferably free of oxygen.

Stannous oxide particles may have any suitable shape. For example, the stannous oxide particles may have a platelet (or flake) shape, or have a generally spherical (or ball-like) shape. The plurality of stannous oxide particles obtained from the present process is readily soluble in acids, such as alkane sulfonic acids and aryl sulfonic acids. Suitable alkane sulfonic acids include and aryl sulfonic acids, without limitation, methane sulfonic acid, ethane sulfonic acid, propane sulfonic acid, phenyl sulfonic acid, phenol sulfonic acid, and tolyl sulfonic acid. Methane sulfonic acid one of the most common acids used as an electrolyte in tin and tin alloy electroplating baths. The present plurality of stannous oxide particles has a methane sulfonic acid dissolution rate of 3.56 g stannous oxide in 8.1 g of 70% methane sulfonic acid of 30 seconds at a temperature of 20 to 25° C., resulting in a clear colorless solution.

Over time, the surface of stannous oxide particles will oxidize to form stannic oxide (or tin (IV)) oxide. Stannic oxide is not as soluble in acid as compared to stannous oxide. The formation of stannic oxide on the surface of the stannous oxide particles adversely affects the solubility of the material. In use, such as in the make-up or the replenishment of an electroplating bath, such stannous oxide having a stannic oxide surface layer does not readily dissolve, and forms turbid solutions that need filtering to be useful, and provide unknown quantities of stannous oxide in solution since not all of the material can be dissolved.

To preserve the stannous oxide of the present invention, it is packaged in a material that has a very low oxygen permeability. It is preferred that the packaging material has an oxygen permeability of <100 cm$^3$/645 cm$^2$·24 hr (or <100 cm$^3$/100 in$^2$·24 hr). Suitable material includes polyethylene terephthalate ("PET") including biaxially-oriented polyethylene terephthalate ("BoPET"), poly(methylmethacrylate), polyvinylidene fluoride, and metallized polymers such as metallized polyethylene terephthalate, metallized nylon, metallized polyethylene and metallized polypropylene. Metals typically used in metallized polymers include, but are not limited to, aluminum, nickel, chromium and gold. It is preferred that when a metallized polymer is used as a packaging material, that it be used as the outer packaging material in a multi-layer packaging system, and that the stannous oxide is first packaged in a non-metallized polymer, such PET or high density polyethylene. That is, packaged stannous oxide is then placed within the metallized polymer package to reduce the possibility of metal leaching into the stannous oxide from the metallized polymer. Preferred materials are polyethylene terephthalate, poly(methylmethacrylate), polyvinylidene fluoride, and metallized polyethylene terephthalate. Preferably, the stannous oxide of the present invention is packaged in an atmosphere that is substantially free of oxygen, and is preferably free of oxygen. Suitable packages include bags, bottles and ampoules. Accordingly, the present stannous oxide particles are substantially free of, and preferably are free of, organic compounds such as antioxidants.

The stannous oxide particles of the invention are particularly useful in the preparation of tin electroplating baths, and more preferably in the preparation and replenishment of tin-alloy electroplating baths, such as tin-silver, tin-bismuth, tin-copper and tin-silver-copper electroplating baths. When low alpha-particle emitting tin metal is used as the source of divalent tin ions, the resulting plurality of stannous oxide particles is low alpha-particle emitting. Preferably, the plurality of stannous oxide particles have an alpha-particle emission of $\leqq 0.05$ cph/cm$^2$.

EXAMPLE 1

100 g of granular tin was charged to a 5 L glass reactor equipped with a mechanical agitator, reflux condenser, and active nitrogen sweep. To this reactor was charged 345 mL of water and 460.5 mL of 37% hydrochloric acid. The solution was heated to an internal temperature of 110° C. and held at that temperature for 12 hours before cooling to an internal temperature of 35° C. The resulting solution was vacuum transferred to 22 L reactor equipped with a mechanical agitator and reflux condenser. This solution was carefully titrated with a previously prepared solution comprising 600.3 g of sodium carbonate dissolved in 2.7 L of water at a rate of 300 mL/min. During the base addition, sufficient agitation was used to dissipate the foam produced during the initial stages of the addition. Following the completion of foam production, the rest of the base solution was added in one shot. The solution was heated to 105° C. and allowed to reflux for 3 hours before cooling the solution back to an internal temperature of 35° C. The crude product mixture was drained from the reactor and vacuum filtered to separate the desired blue/black solid from the clear, colorless liquid. The resulting wet cake was subjected to eight repetitions of suspension in 200 mL of water followed by vacuum filtration. The washed product was transferred to a drying tray and placed in a drying oven set at 70° C. with a constant nitrogen sweep for 12 hours. The resulting material was analyzed by powder X-ray diffraction to indicate the product was pure stannous oxide isolated as 98 g of blue/black crystalline solid. The resulting material was subject to dissolution in aqueous methane sulfonic acid and was found to form a clear, colorless solution within 10 sec.

EXAMPLE 2

25 g of granular tin was charged to a glass reactor equipped with a mechanical agitator, reflux condenser, and active nitrogen sweep. To this reactor was charged 85 g of water and 115 mL of 37% hydrochloric acid. The mixture was heated to 50° C. and allowed to react at that temperature over 72 hours until the solution was clear and colorless before cooling back to ambient temperature. The solution was transferred to a glass reactor equipped with a magnetic stir bar and a reflux condenser. The solution was charged with 187 g of solid potassium carbonate with care being taken at the beginning of the addition to minimize foam formation on the top of the reaction liquor. The resulting light gray slurry was heat to 100° C. and allowed to stir for 1 hr. upon which the solution had changed to black in appearance. The solution was cooled to ambient temperature and then drained from the reactor and vacuum filtered to separate the desired blue/black solid from the clear, colorless liquid. The resulting wet cake was subjected to ten repetitions of suspension in 100 mL of water followed by vacuum filtration. The washed product was transferred to a drying tray and placed in a drying oven set at 70° C. with a constant nitrogen sweep for 12 hr. The resulting material was analyzed by PXRD to indicate the product was pure stannous oxide isolated as 27 g of blue/black crystalline solid. The resulting material was subject to the dissolution in aqueous methane sulfonic acid and was found to form a clear, colorless solution within 30 sec.

EXAMPLE 3

1 kg of low alpha-emitter tin foil was charged to a glass reactor equipped with a mechanical agitator, reflux condenser, and active nitrogen purge. To this reactor was charged 3.42 kg of water and 6.4 kg of 37% hydrochloric acid. The resulting solution was heated from 37 to 105° C. at a rate of 0.5° C./min. and then held at 105° C. for 9 hr. before cooling back to 25° C. To this clear, colorless solution was carefully added a solution comprised of 6 kg of sodium carbonate dissolved in 27 kg of water over the course of 30 min. The resulting white slurry was heated at a rate of 0.3° C./min. until an internal solution temperature of 78° C. was reached and then the solution was cooled back down at a rate of −0.2° C./min. The entire heating/cooling sequence was accomplished over 4 hr. The resulting black suspension was drained from the reactor directly into a vacuum filter pot. The resulting wet cake was washed with 1 kg of water without disturbing the wet cake for six sequential washing steps under constant vacuum filtration conditions. The washed product was transferred to a drying tray and placed in a drying oven set at 70° C. with an active nitrogen sweep and allowed to dry over the course of 12 hr. before being transferred to a dry box for packaging within a high density polyethylene bottle and then heat-sealed within a metallized polyethylene terephthalate bag. The final solid was isolated as 1.0 kg of blue/black crystalline material identified as stannous oxide by PXRD. The resulting material was found to form a clear, colorless solution within 30 s when allowed to react with aqueous methane sulfonic acid. The Sn:O ratio at a 10 nm surface depth was found to be 0.83 by X-ray photoelectron spectroscopy ("XPS") analysis. Analysis of the material by neutron activation analysis-inductively coupled plasma-mass spectroscopy ("NAA-ICP-MS") analysis showed the material to be 99.94% pure. Sodium was found at a level of 2 ppm, and the following metals were analyzed for, but were each below the limit of detection (<1 ppm): Al, B, Ba, Be, Bi, Ca, Cd, Co, Cr, Cu, Fe, K, Li, Mg, Mn, Mo, Ni, Pb, Sr, Ti, V and Zn.

EXAMPLE 4

A solution of stannous chloride was prepared by dissolving stannous chloride dihydrate (29.84 g) in hydrochloric acid (37%, 75 mL) and water (75 mL). The resulting solution was titrated with second solution composed of sodium carbonate (anhydrous, 104.8 g) dissolved in water (480 mL). The resulting white, heterogeneous mixture was heated to reflux (105° C.) and held for one hour before cooling to ambient temperature. The resulting mixture was vacuum filtered through a medium-pore glass frit filter. An aliquot of the wet cake was removed for analysis prior to the resuspension of the wet cake in water (100 mL) within the frit filter reservoir. The vacuum filter, aliquot removal, resuspension sequence was repeated until a total of 15 aliquots were collected. The aliquots were subject to ion-coupled plasma-mass spectrometry (ICP-MS) for impurities analysis and ion chromatography (IC) for chloride impurity analysis. The resulting stannous oxide was found to contain on average 14 ppm of chloride.

EXAMPLE 5

The procedure of Example 4 was repeated except that the amount of base used was increased to 4.75, 5.75 and 6.75 equivalents. In each case, similar results were obtained.

EXAMPLE 6

To a 900 mL solution of 10 wt % tin in excess 20 wt % hydrochloric acid (37%), 600 g of sodium carbonate dissolved in 2713 mL of water was added to raise the pH to >9, completely precipitating the desired white tin oxyhydroxide intermediate.

EXAMPLE 7

The procedure of Example 1 is repeated except that the base is sodium bicarbonate, which is used in a 4 equivalent excess.

EXAMPLE 8

The procedure of Example 7 is repeated except that the base is ammonium carbonate, which is used in a 4.5 equivalent excess.

EXAMPLE 9

The procedure of Example 1 is repeated except that the base is sodium acetate, which is used in a 5.5 equivalent excess.

EXAMPLE 10

Samples were prepared by weighing about 0.1 g of the pure SnO in 30 mL beaker. About 25 mL of 20% HCl was added and thoroughly stirred using a glass rod. The beaker was placed on a hot plate for 2 min. bringing the solution to about 60° C. Further stirring was done and a clear solution was obtained. A 0.47 μm cellulose membrane filter was placed in a filtration cup of a vacuum filtration apparatus. The solution was poured into a filtration cup and the vacuum was turned on. The beaker was rinsed with 15 mL of 20% HCl, poured into the filter cup and sucked through the filter. Two more similar washings were carried out using 15 mL of pure water (18 mΩ) each. The sides of the filtration cup were rinsed further using pure water from a wash bottle. The vacuum was left on for another 2 min. The filter was removed, carefully wrapped and placed into a 2-dram polyethylene vial for neutron activation analysis.

Five batches of samples including 2 samples of commercially available materials as comparatives (samples C-1 and C-2) were used. Each of C-1 and C-2 were obtained from different suppliers. The filters were sequentially prepared as described above with an extra caution of using different beakers for each sample, thoroughly cleaning the filtration system between each sample preparation. The filters were sequentially irradiated for 2 min. at 30 kilowatts ("kW"). A tin standard, from the National Institute of Standards and Technology (NIST, Gaithersburg, Md.) traceable Sn solution, was also prepared into similar vial and analyzed as well. After a waiting time of about 9 min., the gamma spectroscopy was obtained. The amount of total Sn in each filter was obtained using Canberra Software and standard comparative technique. The measure Sn was converted to $SnO_2$ using stoichiometry, assuming that the filter contained only $SnO_2$. The amount of SnO is obtained by subtracting the measured $SnO_2$ wt % from 100. The results are shown in Table 1.

TABLE 1

| Sample No. | Description | Weight of sample, g | Measured $SnO_2$, wt % | Calculated SnO, wt % |
|---|---|---|---|---|
| 1 | Invention | 0.104 | 0.060 | 99.94 |
| 2 | Invention | 0.112 | 0.050 | 99.95 |
| 3 | Invention | 0.104 | 0.027 | 99.97 |

TABLE 1-continued

| Sample No. | Description | Weight of sample, g | Measured SnO$_2$, wt % | Calculated SnO, wt % |
|---|---|---|---|---|
| 4 | Invention | 0.102 | 0.021 | 99.98 |
| 5 | Invention | 0.102 | 0.031 | 99.97 |
| C-1 | Comparative | 0.103 | 0.272 | 99.73 |
| C-2 | Comparative | 0.103 | 0.918 | 99.08 |
| Control | Blank | 0 | 0.0038 | N/A |

The data in Table 1 clearly show that the stannous oxide of the present process has a lower amount of surface oxidation, that is stannic oxide (or SnO$_2$), as compared to commercially available stannous oxide. Accordingly, the present stannous oxide is more readily soluble in acids than other commercially available tin (II) oxide materials.

EXAMPLE 11

Samples of stannous oxide of the invention and commercially available stannous oxide samples, C-1 and C-2, were analyzed to determine the particle size, densities, Sn:O surface ratio, % stannous oxide, and crystallite size. The stannous oxide of the invention was stored in high density polyethylene ("HDPE") containers heat sealed within metallized polyethylene terephthalate bags under an inert atmosphere. Both of the comparative samples C-1 and C-2 were packaged within HDPE containers without any secondary container.

Particle Size Analysis:

The particle size analysis of SnO powder samples was performed using a Particle Sizing System Accusizer 780 equipped with an LE400-0.5 sensor and a HIAC/Royco ABS2 pressurized bottle stand sample delivery system. The samples were prepared for the Accusizer analysis by dispersing the samples in DI water and briefly shaking the dispersion on a vortex shaker to disperse the particles. The dispersions were then diluted in water to a particle concentration that was under 6000 particles per mL and analyzed, using a flow rate of 60 mL/min and an analysis time of 120 sec. An equivalent spherical diameter calibration standard (polystyrene spheres in water) was used to characterize the size of the particles and no correction for particle shape was made. Particle size measurements were performed over the size range from approximately 0.5 to 330 μm.

Pycnometry (True Density and Bulk Density):

The true density was determined using a Helium multipycnometer equipped with a 24 cm$^3$ sample holder. The bulk density was determined by measuring the volume of a known weight of test substance in a cylinder that was rolled horizontally after filling to 90% of its measuring volume. The cylinder was not tapped prior to volume measurement.

X-Ray Diffraction ("XRD"):

A Bruker D-8 Advance θ-θ X-ray diffractometer, equipped with a cobalt sealed-tube source, a primary beam monochromator, and a Vantec-1 linear position sensitive detector, was used for collecting X-ray diffraction patterns. The tube was operated at 30 kV and 50 mA and the samples were illuminated with cobalt K-alpha 1 radiation (wavelength=1.78897 Å). XRD data were collected from 5 to 110° (2θ) with a step size of 0.02°, a 1 sec/step collection and a detector window of 6°. Analysis of the resulting X-ray diffraction patterns was performed using JADE X-ray pattern analysis software V9.3.

X-Ray Photoelectron Spectroscopy ("XPS"):

XPS analysis was performed on a Kratos AXIS HSi XPS S/N 332272/01 instrument, using the settings shown in Table 2.

TABLE 2

| | |
|---|---|
| Instrument | Kratos AXIS HSi XPS S/N 332272/01 |
| X-ray Source | Monochromatic Al Kα 225 Watts (14 kV, 12 mA) |
| Analyzer Pass Energy | 80 eV (survey spectra) |
| | 20 eV (high resolution spectra) |
| Take-Off Angle | 90° |
| Lens Mode | Magnetic |
| Aperture | slot (3 × 10 mm) |
| Iris | 5 turns |
| Analysis Area (16-84% signal level) | 360(x) by 200(y) μm |
| Flood Gun Conditions | Filament Current 1.55 A; Charge Balance 2.25 V |

Neutron Activation Analysis ("NAA"):

Samples were prepared according to the procedure of Example 10.

The results of the analytical investigation are reported in Tables 3 and 4. The commercially available stannous oxide C-1 had a significantly smaller particle size and crystallite size in comparison to the stannous oxide of the invention and commercially available stannous oxide C-2.

TABLE 3

| Analytical Technique/Description | Invention | C-1 | C-2 |
|---|---|---|---|
| Particle Size (μm) | 27.03 | 12.2 | 31.46 |
| True Density (g/cm$^3$) | 6.254 | 6.157 | 6.228 |
| standard deviation | NA | 0.014 | NA |
| Bulk Density (g/cm$^3$) | 2.297 | 1.469 | 1.887 |
| Sn:O surface ratio | 0.86 | 0.73 | 0.6 |
| standard deviation | NA | 0.01 | NA |
| % SnO (NAA) | 99.96 | 99.73 | 99.08 |
| Crystallite Size (Å, from 101) | 1295 | 335 | 1104 |

The true density, or skeletal density, is based on the amount of volume that only the SnO structure occupies (that is, excluding pores, channels, and the like), whereas the bulk density refers to the amount of volume that the bulk particles occupy. Among the three samples, the true density values did not differ significantly, however, the bulk density values of the samples did vary.

Surface oxidation plays a significant role in the reactivity between SnO and methane sulfonic acid. The amount of surface oxidation of the three samples was quantitatively determined via high resolution XPS. The Sn 3d 5/2 electron binding energy of stannic oxide (SnO$_2$) is slightly higher than that of SnO, 486.9 eV and 486.2 eV, respectively. The ratio of XPS signal at these binding energies was converted to a ratio of tin-to-oxygen (Sn:O), with SnO$_2$ having a value of 0.5 and SnO having a value of 1.0. The values in Table 3 show that stannous oxide of the invention had the smallest amount of surface oxidation. Neutron activation analysis (NAA) was used to directly assess the purity of the SnO.

Samples C-1, C-2 and the stannous oxide of the invention were analyzed by ICP-MS to determine metal impurity levels. Each of the samples was analyzed for the following metals: Al, B, Ba, Be, Bi, Cd, Co, Cr, Cu, Fe, L, Li, Mo, Sr, Ti, and V, which in each case were below the limit of detection (<1 ppm). Table 4 shows the metal impurities in any of the samples that were present above the limit of detection, where "ND" means not detected, that is, for that sample, the metal, if present, was below the limit of detection.

TABLE 4

| Metal Impurity | Invention | C-1 | C-2 |
| --- | --- | --- | --- |
| Calcium | 2 | ND | 48 |
| Magnesium | ND | ND | 27 |
| Manganese | ND | 1 | ND |
| Sodium | 2.4 | ND | 572 |
| Nickel | ND | ND | 10 |
| Lead | ND | ND | 38 |
| Zinc | ND | ND | 8 |

EXAMPLE 12

The general procedure of Example 2 was repeated, with the acidic composition being split into multiple samples, where each sample was treated with either a 4-, 5-, 6-, 7- or 8-fold molar excess of base. Increasing the amount of base, increases the average particle size of the resulting stannous oxide particles. These results are shown in FIG. 1. It can be seen from FIG. 1 that a 4-fold molar excess of base provides an average particle size of 6-8 μm, and an 8-fold molar excess of base provides an average particle size of 18-20 μm.

EXAMPLE 13

The general procedure of Example 2 was repeated a number of times, except that the how the acidic composition was prepared and the particular base used were both varied. The results are shown in Table 5.

TABLE 5

| Sample | Digestion Method | Base | Base Addition Method | Final pH | Yield (%) |
| --- | --- | --- | --- | --- | --- |
| 13-1 | A | $Na_2CO_3$ | Aqueous | 9.73 | 97 |
| 13-2 | A | $Na_2CO_3$ | Aqueous | 9.23 | 88 |
| 13-3 | B | $Na_2CO_3$ | Solid | 9.91 | 93 |
| 13-4 | C | $Na_2CO_3$ | Aqueous | 9.68 | 98 |
| 13-5 | B | $K_2CO_3$ | Solid | 10.75 | 94 |
| C-3 | A | NaOH | Aqueous | 12.62 | 65 |
| C-4 | B | NaOH | Solid | 12.43 | 84 |
| C-5 | B | NaOH | Solid | 12.27 | 75 |
| C-6 | B | NaOH | Solid | 12.14 | 90 |
| C-7 | B | KOH | Solid | 13.74 | 76 |

In Table 5, samples 13-1 to 13-5 are samples of the invention and samples C-3 to C-7 are comparatives. The digestion method refers to how the divalent tin ions were added to the acidic composition, where A=dissolving tin metal in concentrated (37%) HCl; B=dissolving tin metal in a 20% solution of HCl; and C=dissolving $SnCl_2 \cdot 2H_2O$ in HCl. For each sample, the weight ratio of tin:acid (HCl) was the same. The base was added to the acidic composition either as a solid or as an aqueous solution. The final pH in Table 5 is the pH of the alkaline composition before heating. The yield is the final yield of stannous oxide particles after heating and separation. These data show that the overall yield of stannous oxide particles was higher for the process of the invention.

EXAMPLE 14

Samples 13-2, 13-4 and C-3 from Example 13, as well as 3 different commercially available stannous oxide samples, comparatives C-8, C-9 and C-10, were analyzed by scanning electron microscopy to determine the average size of the stannous oxide particles. Samples C-8 and C-9 are from the same supplier as sample C-2. From the data shown in Table 6, it is clear that the stannous oxide of the invention has a lower average particle size than the comparative stannous oxides. Also, the present process allows for the preparation of relatively smaller stannous oxide particles, that is having an average particle size from 2 to 4 μm, at higher pH values than is possible using conventional methods.

TABLE 6

| Sample ID | Particle Size |
| --- | --- |
| 12-2 | 2.8 |
| 12-4 | 4 |
| C-3 | 27 |
| C-8 | 5 |
| C-9 | 13.9 |
| C-10 | 30 |

What is claimed is:

1. A plurality of stannous oxide particles having: an average purity of ≧99.8%; an average surface tin:oxygen ratio of from 0.75 to 1; an average particle size of ≦40 μm; a true density of 6 to 6.5 g/cm$^3$; a bulk density of 2 to 2.5 g/cm$^3$; a chloride ion content of ≦25 ppm; and an alkali content of ≦50 ppm.

2. The plurality of stannous oxide particles of claim 1 wherein the surface tin:oxygen ratio is from 0.8 to 1.

3. The plurality of stannous oxide particles of claim 1 having a methane sulfonic acid dissolution rate of 3.56 g stannous oxide in 8.1 g of 70% methane sulfonic acid of 30 seconds at a temperature of 20 to 25° C. to provide a clear colorless solution.

4. The plurality of stannous oxide particles of claim 1 having an alpha-particle emission of ≦0.05 cph/cm$^2$.

5. The plurality of stannous oxide particles of claim 1 having an average purity of ≧99.9%.

6. The plurality of stannous oxide particles of claim 1 having a chloride ion content of ≦15 ppm.

7. The plurality of stannous oxide particles of claim 1 having an alkali content of ≦25 ppm.

8. The plurality of stannous oxide particles of claim 1 being substantially free of organic compounds.

9. A product comprising a plurality of stannous oxide particles having: an average purity of ≧99.8%; an average surface tin:oxygen ratio of from 0.75 to 1; an average particle size of ≦40 μm; a true density of 6 to 6.5 g/cm$^3$; a bulk density of 2 to 2.5 g/cm$^3$; a chloride ion content of ≦10 ppm; and an alkali content of ≦50 ppm contained within a sealed package, the sealed package being comprised of a material having an oxygen permeability of <100 cm$^3$/100 in$^2$·24 hr.

10. The packaged product of claim 9 wherein the material is chosen from polyethylene terephthalate, poly(methylmethacrylate), polyvinylidene fluoride, and metallized polymers.

11. The packaged product of claim 10 wherein the metallized polymers are chosen from metallized polyethylene terephthalate, metallized nylon, metallized polyethylene and metallized polypropylene.

* * * * *